United States Patent Office 2,962,442
Patented Nov. 29, 1960

2,962,442

PREPARATION OF ALDEHYDE-POLYAMINE-HYDROXYAROMATIC COMPOUND CONDENSATES AND HYDROCARBON FRACTIONS CONTAINING THE SAME

Harry J. Andress, Jr., Pitman, N.J., assignor to Socony Mobil Oil Company, Inc., a corporation of New York No Drawing. Filed Jan. 3, 1957, Ser. No. 632,254

14 Claims. (Cl. 252—51.5)

This invention has to do with a method for preparing condensation products of certain aldehydes, polyamines and hydroxyaromatic compounds, and also has to do with hydrocarbon fractions containing the improved products obtained by such method.

As described by E. A. Oberright in U.S. Patent No. 2,459,112, issued January 11, 1949, condensation can be affected of an aldehyde, a polyamine in which each amino group is characterized by the presence of at least one hydrogen atom, and a hydroxyaromatic compound. The products obtained by condensation are possessed of multi-functional properties, imparting a plurality of improved characteristics to hydrocarbon fractions. The procedure given for the condensation involves: adding the reactants to each other in any order; carrying out reaction at room temperature over a relatively long period of time, or at the reflux temperature of the solvent used over a comparatively short time period. The reaction product so obtained may be washed with water to complete the removal of any unreacted amine from the product.

It has now been found that the condensation described in Patent No. 2,459,112 can be effected more advantageously by a new procedure, which makes possible obtainment of products having surprisingly superior behavior as lubricating oil detergents and as fuel oil stabilizers.

It is an object of this invention, therefore, to provide a new method for condensing an aldehyde, a polyamine in which each amino group is characterized by the presence of at least one hydrogen atom, and a hydroxyaromatic compound to form a product soluble in a hydrocarbon fraction.

It is a further object of this invention to condense said reactants and to obtain thereby condensation products having outstanding lubricating oil detergency properties. A related object is to obtain by said condensation, products having outstanding fuel oil stabilizing capacity.

Another object of the invention is to provide lubricating oils of improved detergent character.

Still another object of the invention is to stabilize fuel oils. A related object is to provide fuel oils stabilized against the formation of sediment therein. Another related object is the provision of a fuel oil free from or of lessened screen-clogging tendencies.

Additional objects of the invention will be apparent from the following description:

It has now been found that the aforesaid object of providing a new method for the condensation is realized by:

(1) condensing the hydroxyaromatic compound with the aldehyde at a temperature between about 150° C. and about 250° C., and preferably about 200° C., for a period of time from about 1 to about 5 hours, and preferably about 4 hours, in the presence of a relatively small amount of a basic catalyst;

(2) adding acid to the reaction mixture of (1) to substantially neutralize the mixtures; and (3) reacting the resulting mixture of (2) with the polyamine at a temperature between about 150° C. and about 250° C., and preferably about 200° C., for a period of time from about 1 to about 5 hours, and preferably about 3 hours, whereupon the desired condensation product is obtained.

Still further improvement is realized by washing the condensation product obtained in (3) above, with water. The water-washed product has been found to have a substantially lower nitrogen content than the product not so washed; and has been found to have a substantially higher lubricating oil detergency rating than the product not so washed.

Distinguishing further from the earlier products described in Patent No. 2,459,112, the products preferred herein are those which are prepared by condensing about one molar proportion of an aldehyde with a molar proportion of a hydroxyaromatic compound and with from about 0.05 to about 0.2 molar proportion of the polyamine. Here, however, the condensation is preferably carried out in the absence of a solvent.

The reactants described in Patent No. 2,459,112 are also the reactants contemplated herein. That is, aliphatic aldehydes which can be used are typified by formaldehyde (such as paraformaldehyde and trioxane), acetaldehyde and aldol β-hydroxy butyraldehyde). Representative of the aromatic aldehydes suitable for use are benzaldehyde and salicylaldehyde. Illustrative of the heterocyclic aldehydes for use herein are furfural and thiophene aldehyde. The aldehyde can contain a substituent group such as hydroxyl, halogen, nitro and the like; in short, any substituent which does not take a major part in the reaction. Preferred are the aliphatic aldehydes, of which formaldehyde is particularly preferred.

Hydroxyaromatic compounds advantageous herein include those recited in the aforesaid patent, namely: phenol, resorcinol, hydroquinone, catechol, cresol, xylenol, hydroxydiphenyl, benzylphenol, phenylethylphenol, phenol resins, methylhydroxydiphenyl, guiacol, alpha and beta naphthol, alpha and beta methylnaphthol, tolylnaphthol, xylylnaphthol, benzylnaphthol, anthranol, phenylmethylnaphthol, phenanthrol, monomethyl ether of catechol, phenoxyphenol, chlorphenol, and the like.

The hydroxyaromatic compound may contain one or more alkyl substituents such as short-chain groups, typified by methyl, ethyl, amyl, etc., or long-chain, relatively-high-molecular-weight hydrocarbon groups having at least twenty carbon atoms, typified by alkyl groups derived from petroleum wax, which is a predominantly straight-chain aliphatic hydrocarbon of at least twenty carbon atoms. It will be obvious to those skilled in the art that the maximum number of alkyl groups is limited by the number of valences on the aromatic nucleus available for substitution. Naturally, the maximum number of such groups which can be attached to a single aromatic nucleus will vary as the nucleus is mono- or polycyclic and as the nucleus is otherwise substituted, with such groups as carboxy, nitro, amino, halogen and the like.

More advantageous are those hydroxyaromatic compounds which contain one or more alkyl substituents, the total number of alkyl carbon atoms being at least about 8 and preferably at least about 18. In general, a great number of alkyl carbon atoms will be present in the hydroxyaromatic compound used in forming a condensation product must suitable as a lubricating oil additive, than need be present in the hydroxyaromatic compound used in preparing a fuel additive.

Again, the polyamines of this invention include those recited in the aforesaid patent. In the language of the patent such polyamines are those in which each amino group is characterized by the presence of at least one hydrogen atom. Such polyamines may contain only primary amino groups, only secondary amino groups, or both primary and secondary groups. Typical polyamines are the aliphatic homologs, ethylene diamine, propylene diamine, polyalkene polyamines (e.g., diethylene triamine, triethylene tetramine); the aromatic homologs, o-, m- and p-phenylene diamine, diamino naphthalenes, etc. Of this class of amines, preference is given to the diamines in which two primary amino groups are attached to adjacent carbon atoms, and particular preference is accorded polyethyleneamines such as triethylene tetramine.

As indicated above, a basic catalyst is used in the initial step (1) of the condensation, that of reacting the hydroxyaromatic compound and the aldehyde. Typical of such catalysts are sodium, potassium, lithium, barium and calcium hydroxides, amines such as pyridine, quarternary ammonium hydroxides such as benzyl trimethyl ammonium hydroxide. Generally, sodium hydroxide is most advantageous in view of its low cost.

With regard to acids which are suitable for the neutralization step (2), mineral acids are generally most useful. Typical acids are hydrochloric, phosphoric, sulfuric and acetic.

Catalysts are not used in step (3) of the preparation outlined above.

The temperatures employed in the new procedure are substantially above those used in the procedure described in Patent No. 2,459,112. In steps (1) and (3), the temperatures range from about 150° C. to about 250° C., with preference being given to those of about 200° C. The reaction times in steps (1) and (2) are 1 to 5 hours.

In general, satisfactory results are attained when the steps are carried out at atmospheric pressure.

The invention is further illustrated by the following typical examples which in no sense, are intended as limiting the invention. Rather, the examples represent preferred embodiments of the invention.

EXAMPLE I

This example is provided by way of comparison, since the preparation is typical of those described in Patent No. 2,459,112.

A mixture of 618 parts by weight (1.8 molar proportions) of dinonyl phenol, 14.9 parts by weight (1.8 molar proportions) of 36 percent aqueous formaldehyde, and 44 parts by weight (0.3 molar proportion) of triethylene tetramine, was diluted with 200 parts by volume of benzene. The resulting mixture was refluxed at about 85–90° C. for 2½ hours. The reaction mixture was filtered through Hi-Flo clay (a diatomaceous earth). The filtrate, the desired product, contains 2.33 percent of nitrogen by weight. This is identified as Product I.

EXAMPLE II

Approximately 125 parts by weight of the product (Product I) obtained in Example I, was washed with water. Thirty successive portions, each of 100 parts by volume, of water, were used. The last water wash was neutral. The water-washed product (Product II) contains 1.93 percent of nitrogen.

EXAMPLE III

A mixture of 520 parts by weight (1.5 molar proportions of dinonyl phenol, 6 parts by weight of sodium hydroxide dissolved in 15 parts by weight of water, and 47 parts by weight of 95 percent paraformaldehyde (balance water) was diluted with 400 parts by volume of benzene. The diluted mixture while being agitated, was heated slowly to 200° C. over a period of 2½ hours. The reaction mixture was cooled to 100° C., was neutralized with 15 parts by weight of hydrochloric acid (37%), and was heated to 175° C. The neutralized mixture was cooled to 100° C., 36.5 parts by weight (0.25 molar proportion) of triethylene tetramine was added, and the mixture so formed was stirred at 210° C. for three hours. Filtration of the final reaction through Hi-Flo clay provided a filtrate (Product III) having a nitrogen content of 1.04 percent.

EXAMPLE IV

Approximately 254 parts by weight of Product III was water-washed with thirty successive portions of water, each comprising 100 parts by weight. The final water wash was neutral. This water-washed (Product IV) contains 0.41 percent of nitrogen.

EXAMPLE V

A mixture of 400 parts by weight (0.5 molar proportion) of wax phenol (3–14) diluted with 400 parts by weight of a paraffin oil (100 secs., SUV, at 100° F.), 15 parts by weight (0.5 molar proportion) of paraformaldehyde, and 4 parts by weight of sodium hydroxide dissolved in 15 parts by weight of water, was heated slowly to 200° C. over a period of 4 hours. The mixture was cooled ao 100° C., was neutralized with 10 parts by weight of hydrochloric acid (37%), and was heated to 175° C. After being cooled to 90° C., 12.5 parts by weight (0.083 molar proportion) of triethylene tetramine were added, and the resulting mixture was stirred at 225° C. for 3 hours. The reaction was then water-washed seven times with successive portions of water, each 100 parts by weight. Filtration of the water-washed reaction mixture, through Hi-Flo clay provided a filtrate (Product V) which has a nitrogen content of 0.22 percent.

Wax phenol (3–14) used in this example was prepared by the following procedure:

A paraffin wax melting at approximately 120° F. and predominantly comprised of hydrocarbons, having at least 20 and an average of about 24 carbon atoms in their molecules, is melted and heated to about 200° F., after which chlorine is bubbled therethrough until the wax has absorbed about 14%, by weight, of chlorine. A sufficient quantity of this chlorinated wax to provide 3 atomic proportions of chlorine is then heated to a temperature varying from just above its melting point to not over 150° F. One mol of phenol ($C_6H_5OH$) is then mixed with the chlorowax. The mixture is then heated to about 150° F. and a quantity of anhydrous aluminum chloride, corresponding to about 3% of the weight of the chlorowax in the mixture, is slowly added with active stirring. The rate of addition of the aluminum chloride should be sufficiently slow to avoid violent foaming and during the addition the temperature should be held at about 150° F. After the aluminum chloride has been added the temperature of the mixture may be increased slowly over a period of from 15 to 25 minutes to a temperature of about 250° F. and then should be more slowly increased to about 350° F. To control the evolution of HCl gas, the temperature of the mixture is preferably raised from 250° F. to 350° F. at a rate of approximately one degree per minute, the whole operation operation occupying approximately two hours from the time of adding the aluminum chloride. If the emission of HCl gas has not ceased when the final temperature is reached, the mixture may be held at 350° F. for a short time to allow completion of the reaction. However, to avoid possible cracking of the wax, the mixture should not be heated appreciably above 350° F. nor should it be held at that temperature for any extended length of time.

It is important that all unreacted, or non-alkylated, phenol remaining in the reaction mixture, as well as aluminum chloride, be removed. This can be conveniently effected by washing the product several times with a mixture of water and an alcohol, such as butanol, preferably at elevated temperature, say 175° F. The product may then be treated with steam. This latter step will insure complete removal of the unreacted material and also dry the product.

It will be understood that a wax-substituted phenol prepared according to the above procedure in which a quantity of chlorowax containing three atomic proportions of chlorine and having a chlorine content of 14% is reacted with one mol of phenol, is designated as "wax-phenol (3–14)." Similarly, "wax-phenol (3–10)" and "wax-phenol (1–10)" may also be prepared by the reaction of sufficient amounts of chlorinated wax, containing 10 percent by weight of chlorine, to provide 3 atomic proportions and 1 atomic proportion of chlorine per mol of phenol, respectively, in the reaction and are useful in the invention. In general, the amount of chlorowax, containing from about 10 to 18 percent by weight of chlorine, used in the reaction is sufficient to supply between 1 and 4 atomic proportions of chlorine per mol of phenol used.

Further details relative to the procedure for the preparation of wax phenols suitable for use herein may be had by reference to Patent No. 2,191,499, issued February 27, 1940, to Orland M. Reiff.

It is to be noted from the foregoing examples that repeated water-washing of the reaction products, lowered the nitrogen content thereof by about sixty (60) percent. This is in contrast to similar water-washing of the reaction products made by the earlier procedure; nitrogen content was lowered by about ten to fifteen (10–15) percent. Water washing improved the lubricating oil detergency ratings of both products. However, the non-water-washed product made by the new method had a higher detergency rating then the water-washed product made by the prior method.

As indicated above, the condensation products of this invention, when added to hydrocarbon fractions in minor proportions, have been found to improve such fractions in several important respects. This is shown below in several tabulations of test results.

*CFR diesel detergency test D–21*

This test determines the effectiveness of the lubricating oil in preventing piston deposits and top ring wear. A single cylinder, CFR 4-cycle, supercharged diesel engine is used. The operating conditions are as follows:

Oil temperature _____ ° F__ 175
Jacket temperature _____ ° F__ 212
Speed _____ r.p.m__ 1800
Brake load _____ H.P__ 7.5

A one and one-half gallon sample of oil is used with addition of oil every 8 hours starting at 4 hours. The duration of the test is 16 hours. The diesel fuel used contained 1% sulfur. The results of the test are reported in terms of piston cleanliness ratings as in the D–4A test.

Results of these tests are given below in Table I.

TABLE I

*CFR diesel engine detergency test D–21*

| Compound (Blended in an S.A.E. 30 Solvent Refined Mid-Continent Oil | Concn., Wt. Percent | Rating |
|---|---|---|
| Base Oil | 0 | 67 |
| Base Oil—Example 1 | 3 | 69 |
| Base Oil—Example 2 | 3 | 73 |
| Base Oil—Example 3 | 3 | 79 |
| Base Oil—Example 4 | 3 | 82 |

*CRC caterpillar engine test L–1*

This is a specification engine test to determine the ability of an oil to prevent engine deposits including the piston and crankcase deposits. A single cylinder, 4-cycle caterpillar engine is used. The operating conditions are as follows:

Oil temperature _____ ° F__ 150
Jacket temperature _____ ° F__ 180
Speed _____ r.p.m__ 1000
Brake load _____ H.P__ 19.8

Twenty gallons of oil is used in the engine at the start of the test and the oil is changed at 120-hour intervals. The duration of the test is 480 hours. The diesel fuel used contained 0.4% sulfur. The condition of the engine at the end of the test is expressed by an engine cleanliness rating based on a scale from 0 to 100, 100 being a perfectly clean engine.

Test results are given below in Table II.

TABLE II

*Caterpillar L–1 test (120 hrs.)*

| Compound (Blended in an S.A.E. 30 Solvent Refined Mid-Continent Oil | Concn., Wt. Percent | Rating |
|---|---|---|
| Base Oil | 0 | 61.9 |
| Base Oil+Antioxidant A [1] | 0.75 | 59.3 |
| Base Oil+0.75% Antioxidant A [1]+Ex. 5 | 3.0 | 95.6 |

[1] Antioxidant A is a commercial antioxidant comprising an oil-soluble, phosphorus- and sulfur-containing reaction product as described in U.S. Patent No. 2,416,281.

The amount of improving agent used varies with the mineral oil or lubricating oil fraction with which it is blended and with the properties desired in the final oil composition. These reaction products can be added to mineral oil in amounts of from about 0.001 to about 10 percent, but amounts of from about 0.1 percent to about 3 percent generally provide satisfactory improvement. The reaction products can be used also in such amounts, in grease compositions.

*Fuel oil stabilization*

The fuel oils improved in accordance with this invention are hydrocarbon fractions having initial boiling points of at least about 100° F. and end points not higher than about 750° F., and which boil substantially continuously throughout their distillation ranges. Such fuel oils are generally known as distillate fuel oils. It is to be understood, however, that this term is not restricted to straight-run distillate fractions. Thus, as is well known to those skilled in the art, the distillate fuel oils can be straight-run distillate fuel oils, catalytically or thermally cracked distillated fuel oils or mixtures of straight-run distillates, naphthas and the like, with cracked distillate stocks. Moreover, such fuel oils can be treated in accordance with well known commercial methods, such as, acid or caustic treatment, solvent refining, clay treatment, etc.

The distillate fuel oils are characterized by their relatively low viscosities, pour points and the like. The principal property which characterizes the contemplated hydrocarbon fractions, however, is the distillation range. As mentioned hereinbefore, this range will lie between about 100° F. and about 750° F. Obviously, the distillation range of each individual fuel oil will cover a narrower range falling, nevertheless, within the above-specified limits. Likewise, each fuel oil will boil substantially, continuously throughout its distillation range. The fuel oils particularly contemplated herein are Nos. 1, 2 and 3 fuel oils used in domestic heating and as diesel fuel oils, particularly those made up chiefly or entirely of cracked distillate stocks. The domestic heating oils generally conform to the specification set forth in ASTM Specifications D396–48T. The specifications for diesel fuels are defined in ASTM Specifications D975–48T. Contemplated herein also are fuels for jet combustion engines. Typical jet fuels are defined in Military Specification MIL–F–5624B.

As is well known, fuel oils of the above-defined character have a tendency to deteriorate in storage and to form colored bodies and sludge therein. This deterioration of the oil is highly undesirable in that it causes serious adverse effects on the characteristics of the oil, particularly on the ignition and burning qualities thereof. It is also a contributory factor, along with the presence of other impurities in the oil, such as rust, dirt and moisture, in causing clogging of the equipment parts, such as screens, filters, nozzles, etc. as is explained hereinbelow. An important economical factor is also involved in the problem of oil deterioration in storage, viz., customer resistance. Thus, customers judge the quality of an oil by its color and they oftentimes refuse to purchase highly colored oils. It will be appreciated, then, that since fuel oils of necessity are generally subject to considerable periods of storage prior to use, the provision of a practical means for preventing the deterioration of the fuel oil during such storage would be a highly desirable and important contribution to the art.

Another and distinct problem that has plagued fuel oil manufacturers and users is that preferred to as "screen-clogging." This involves the deposition of foreign substances, such as water droplets, rust and dirt particles, as well as any sludge material formed by the deterioration of the oil, on the metallic surfaces of screens and filters of burners and engines in which the oil is utilized. Additives have been developed to impart anti-clogging properties to fuel oils, functioning therein to inhibit the aforesaid deposition of foreign substances. The mechanism by which the clogging is prevented involves the adsorption of the anti-clogging agent or additive on the metal surfaces whereby the contacting of these surfaces by the foreign substances and/or preformed sludge is prevented. In this way, deposition and build-up of these materials on the metal surfaces is avoided. It will be appreciated, therefore, that the problem of preventing screen-clogging by fuel oils is entirely different from that of preventing the formation of sediment and color therein as occurs in the oil during prolonged periods of storage. Thus, it will be appreciated that any fuel distribution system will contain small amounts of foreign substances, such as condensed moisture and particles of rust and dirt, which become entrained in the oil, even though the oil has not been stored for any appreciable length of time. On the other hand, fuel oils which have been in storage for substantial periods of time will also contain another kind of sediment, or sludge, which is produced by the gradual deterioration of the oil per se. This sediment, or sludge, is formed in the oil as the result of chemical phenomena. Thus, during storage, oxidation of the various components of the oil, such as pyrrolic compounds; phenols and thiophenols present therein, takes place forming quinoid molecules which condense with one another and/or with other active hydrogen compounds also present in the oil to produce highly colored bodies of increasing molecular weight. When an oil has been in storage for any substantial period of time these compounds separate out as insoluble sludge. Additives have also been developed to inhibit the formation of sediment or sludge in the oil due to oxidative deterioration of the oil in storage, as above described. Such additives act by inhibiting the initial oxidation and the subsequent reactions which produce such sludge.

It is apparent, then, that the problem of preventing screen-clogging by fuel oils is entirely different from the problem of preventing the formation of sediment and color therein as occurs in the oil during prolonged periods of storage. As evidence of the difference between these problems, additives which prevent screen-clogging have generally little or no effectiveness in preventing the formation of sediment and color. Correspondingly, other additives which effectively inhibit sediment and color formation generally have little or no anti-screen clogging properties.

The effectiveness of the additives of this invention in stabilizing a typical fuel oil against sediment formation therein, is shown by screen-clogging test data. The amount of screen-clogging is determined with a Sundstrand V3 or S1 home fuel oil burner pump having a self-contained, 100 mesh Monel metal screen. About 0.5 percent, by weight, of a naturally-formed fuel oil sludge, composed of fuel oil, water, dirt, rust, and organic sediment, is added to ten liters of the fuel oil under test. This mixture is circulated by the pump through the screen for six hours. Then the sludge deposited on the screen is washed off with normal pentane, and filtered through a tarred asbestos (Gooch Crucible) filter. After it is dried, the material on the filter is washed with a 50–50 (volume) acetone-methanol mixture. The total amount of organic sediment is determined by evaporating the n-pentane and the acetone-methanol filtrates, and weighing the residue. The weight of the material on the filter is the amount of inorganic sediment deposited. The sum of the weights of the organic and the inorganic deposits, in milligrams, gives the weight of sludge deposited, which weight is compared with the weight of sludge deposited from the uninhibited ("blank") fuel oil to determine the percent of screen-clogging. The uninhibited fuel oil, after six hours on test, effects 100-percent screen-clogging. Thus, the comparison percentage wise between the weight of sludge deposited by the uninhibited fuel oil and the inhibited fuel oil affords a measure of the percent of screen-clogging. The fuel oil used in the test is a blend comprising sixty percent (by weight) of catalytically cracked component and 40% of straight-run component, the blend having a boiling range from about 320° F. to about 640° F. The data obtained from said tests are provided in Table III.

TABLE III

*Fuel oil screen-clogging test*

| Inhibitor | Conc., lb./ 1,000 bbls. | Screen Clogging, Percent |
|---|---|---|
| Unhibited fuel blend | 0 | 100 |
| Fuel + Example 1 | 50 | 99 |
| Fuel + Example 4 | 50 | 3 |
| Fuel + Example 5 | 50 | 1 |

A further demonstration of the sediment inhibiting character of the additives contemplated herein is shown by results of 110° F. storage tests. In this test, a 500-milliliter sample of the fuel oil under test is placed in a convected oven maintained at 110° F. for a period of twelve weeks. Then, the sample is removed from the oven and is cooled. The cool sample is filtered through a tarred asbestos filter (Gooch Crucible) to remove the insoluble matter. The weight of such matter, in milligrams, is reported as the amount of sediment. In this test, a sample of the blank, uninhibited oil is run along with the fuel oil blend under test. The oil used is the same as that described above in connection with Table I. The effectiveness of a fuel oil composition containing an inhibitor is determined by comparing the test data therefore with the test data for the uninhibited, blank oil. Results of the storage tests are given in Table IV.

TABLE IV

*Fuel oil stability test*

| Inhibitor | Twelve Weeks Storage at 110° F. | |
|---|---|---|
| | Conc., lb./ 1,000 bbls. | Sediment mg./liter |
| Unhibited fuel blend | 0 | 104 |
| Fuel + Example 1 | 50 | 102 |
| Fuel + Example 4 | 50 | 24 |
| Fuel + Example 5 | 50 | 23 |

The condensation products contemplated here are used in fuel oils in concentrations varying between about 1 pound per thousand barrels of oil, and about 200 pounds per thousand barrels of oil. Preferably the concentration will vary between about 10 and 100 pounds per thousand barrels. In terms of weight percent, based upon the weight of the fuel oil, the concentrations vary preferably between about 0.005% and about 0.05%.

It is to be understood that the foregoing description of the new method of preparation, of the new condensation products, and of the hydrocarbon fractions containing such products, is illustrative only. The invention is not to be construed as limited thereto, but includes within its scope such changes and modifications as fairly come within the spirit of the appended claims.

I claim:

1. An improved hydrocarbon fraction selected from the group consisting of a mineral oil and a distillate fuel oil, containing a minor proportion, from about 0.0005 to about 10 percent by weight of the oil, of a nitrogen-containing condensation product of a (1) aldehyde, (2) a hydroxyaromatic compound and (3) a polyamine in which each amino group has at least one hydrogen atom, said product being obtained by: (A) reacting the hydroxyaromatic compound (1) with the aldehyde (2) at a temperature between about 150° C. and about 250° C., in the presence of a basic catalyst; (B) adding a mineral acid to the reaction product obtained in (A) in an amount sufficient to substantially neutralize said reaction product; and (C) reacting the product obtained in (B) with the polyamine (3) at a temperature between about 150° C. and about 250° C., whereupon the said condensation product is formed; the proportions of the reactants being one molar proportion of aldehyde, about one molar proportion of hydroxyaromatic compound and from about 0.05 to about 0.2 molar proportion of polyamine.

2. An improved mineral oil containing a minor proportion, from about 0.001 to about 10 percent by weight of the oil, of a nitrogen-containing condensation product of a (1) aldehyde, (2) a hydroxyaromatic compound and (3) a polyamine in which each amino group has at least one hydrogen atom, said product being obtained by: (A) reacting the hydroxyaromatic compound (1) with the aldehyde (2) at a temperature between about 150° C. and about 250° C., in the presence of a basic catalyst; (B) adding a mineral acid to the reaction product obtained in (A) in an amount sufficient to substantially neutralize said reaction product; and (C) reacting the product obtained in (B) with the polyamine (3) at a temperature between about 150° C. and about 250° C., whereupon the said condensation product is formed; the proportions of the reactants being one molar proportion of aldehyde, about one molar proportion of hydroxyaromatic compound and from about 0.05 to about 0.2 molar proportion of polyamine.

3. A distillate fuel oil containing a small amount, from about 0.005 to about 0.05 percent by weight of the oil, of a nitrogen-containing condensation product of (1) an aldehyde, (2) a hydroxyaromatic compound and (3) a polyamine in which each amino group has at least one hydrogen atom, said product being obtained by: (A) reacting the hydroxyaromatic compound (1) with the aldehyde (2) at a temperature between about 150° C. and about 250° C., in the presence of a basic catalyst; (B) adding a mineral acid to the reaction product obtained in (A) in an amount sufficient to substantially neutralize said reaction product; and (C) reacting the product obtained in (B) with the polyamine (3) at a temperature between about 150° C. and about 250° C., whereupon the said condensation product is formed; the proportions of the reactants being one molar proportion of aldehyde, about one molar proportion of hydroxyaromatic compound and from about 0.05 to about 0.2 molar proportion of polyamine.

4. An improved hydrocarbon fraction selected from the group consisting of a mineral oil and a distillate fuel oil, containing a minor proportion, from about 0.0005 to about 10 percent by weight of the oil, of a nitrogen-containing condensation product obtained by condensing one-and-a-half molar proportions of formaldehyde, about one-and-a-half molar proportions of dinonylphenol, and about one-quarter molar proportion of triethylene tetramine, said product being obtained by: (A) reacting the dinonylphenol with the formaldehyde at a temperature of about 200° C. in the presence of a basic catalyst; (B) adding a mineral acid to the reaction product obtained in (A) in an amount sufficient to substantially neutralize said reaction product; and (C) reacting the product obtained in (B) with the triethylene tetramine at a temperature of about 200° C., whereupon the said condensation product is formed.

5. An improved hydrocarbon fraction selected from the group consisting of a mineral oil and a distillate fuel oil, containing a minor proportion, from about 0.0005 to about 10 percent by weight of the oil, of a nitrogen-containing condensation product obtained by condensing one molar proportion of formaldehyde, about one-and-a-half molar proportions of dinonylphenol, and about one-quarter molar proportion of triethylene tetramine, said product being obtained by: (A) reacting the dinonylphenol with the formaldehyde at a temperature of about 200° C. in the presence of a basic catalyst; (B) adding a mineral acid to the reaction product obtained in (A) in an amount sufficient to substantially neutralize said reaction product; and (C) reacting the product obtained in (B) with the triethylene tetramine at a temperature of about 200° C.; and (D) washing the product obtained in (C) with water until the wash water is neutral, whereupon the said condensation product is obtained.

6. An improved hydrocarbon fraction selected from the group consisting of a mineral oil and a distillate fuel oil, containing a minor proportion, from about 0.0005 to about 10 percent by weight of the oil, of a nitrogen-containing condensation product obtained by condensing one molar proportion of formaldehyde, about one molar proportion of wax-phenol (3–14), and about 0.2 molar proportion of triethylene tetramine, said product being obtained by: (A) reacting the wax-phenol (3–14) with the formaldehyde at a temperature of about 200° C. in the presence of a basic catalyst; (B) adding a mineral acid to the reaction product obtained in (A) in an amount sufficient to substantially neutralize said reaction product; (C) reacting the product obtained in (B) with the triethylene tetramine at a temperature of about 225° C.; and (D) washing the product obtained in (C) with water until the wash water is neutral, whereupon the said condensation product is obtained.

7. The method of preparing a nitrogen-containing condensation product of (1) an aldehyde, (2) a hydroxyaromatic compound and (3) a polyamine in which each amino group has at least one hydrogen atom, which comprises: (A) reacting the hydroxyaromatic compound (1) with the aldehyde (2) at a temperature between about 150° C. and about 250° C., in the presence of a basic catalyst; (B) adding a mineral acid to the reaction product obtained in (A) in an amount sufficient to substantially neutralize said reaction product; and (C) reacting the product obtained in (B) with the polyamine (3) at a temperature between about 150° C. and about 250° C., whereupon the said condensation product is formed; the proportions of the reactants being one molar proportion of aldehyde, about one molar proportion of hydroxyaromatic compound and from about 0.05 to about 0.2 molar proportion of polyamine.

8. The method of claim 7 wherein the said product is washed with water until the wash water is neutral.

9. The method of claim 7 wherein the aldehyde (1) is an aliphatic aldehyde.

10. The method of claim 7 wherein the aldehyde (1) is formaldehyde.

11. The method of claim 7 wherein the hydroxyaromatic compound (2) is a phenol.

12. The method of claim 7 wherein the hydroxyaromatic compound (2) is an alkyl-substituted phenol containing at least about 18 carbon atoms per molecule.

13. The method of claim 7 wherein the polyamine (3) is an aliphatic polyamine.

14. The method of claim 7 wherein the polyamine (3) is triethylene tetramine.

References Cited in the file of this patent

UNITED STATES PATENTS

| | | |
|---|---|---|
| 2,250,188 | Wilson | July 22, 1941 |
| 2,353,192 | Sargent et al. | July 11, 1944 |
| 2,459,112 | Oberright | Jan. 11, 1949 |
| 2,585,196 | Walton | Feb. 12, 1952 |
| 2,619,459 | Neff | Nov. 25, 1952 |
| 2,632,696 | Smith et al. | Mar. 24, 1953 |
| 2,743,255 | De Groote | Apr. 24, 1956 |

OTHER REFERENCES

"The Chemistry of Phenolic Resins," Martin (1956), pp.124–127, John Wiley & Sons, Inc.

UNITED STATES PATENT OFFICE
CERTIFICATION OF CORRECTION

Patent No. 2,962,442                        November 29, 1960

Harry J. Andress, Jr.

It is hereby certified that error appears in the above numbered patent requiring correction and that the said Letters Patent should read as corrected below.

Column 4, lines 55 and 56, for "whole operation operation" read -- whole heating operation --.

Signed and sealed this 16th day of May 1961.

(SEAL)
Attest:
ERNEST W. SWIDER
Attesting Officer

DAVID L. LADD
Commissioner of Patents